(12) United States Patent
Heeg et al.

(10) Patent No.: US 8,757,678 B2
(45) Date of Patent: Jun. 24, 2014

(54) LOCKING DEVICE FOR A VEHICLE SEAT

(75) Inventors: Norbert Heeg, Dahn (DE); Peter Müller, Mackenbach (DE); Andreas Diehl, Otterberg (DE)

(73) Assignee: Keiper GmbH & Co. KG, Kaiserslautern (DE)

(*) Notice: Subject to any disclaimer, the term of this patent is extended or adjusted under 35 U.S.C. 154(b) by 887 days.

(21) Appl. No.: 12/641,928

(22) Filed: Dec. 18, 2009

(65) Prior Publication Data

US 2010/0189495 A1 Jul. 29, 2010

(30) Foreign Application Priority Data

Dec. 19, 2008 (DE) .................. 10 2008 064 458

(51) Int. Cl.
*E05C 3/06* (2006.01)
*B60N 2/02* (2006.01)

(52) U.S. Cl.
USPC .............. 292/201; 292/216; 292/DIG. 23; 296/65.17; 297/378.13

(58) Field of Classification Search
USPC ......... 297/378.13, 378.12; 296/65.16, 65.17; 292/201, 216, DIG. 23, DIG. 43, 292/DIG. 65, 336.3
See application file for complete search history.

(56) References Cited

U.S. PATENT DOCUMENTS

| | | | | |
|---|---|---|---|---|
| 2,943,880 A * | 7/1960 | Joachim et al. | ................ | 292/201 |
| 3,387,885 A * | 6/1968 | Boschen et al. | ......... | 297/378.12 |
| 3,566,703 A * | 3/1971 | Van Noord | ........................ | 74/50 |
| 3,655,240 A * | 4/1972 | DuRocher et al. | ........ | 297/378.12 |
| 4,624,491 A * | 11/1986 | Vincent | .......................... | 292/201 |
| 4,735,447 A * | 4/1988 | Kleefeldt | ....................... | 292/216 |
| 4,976,477 A * | 12/1990 | Nakao | ............................. | 292/201 |
| 5,020,838 A * | 6/1991 | Fukumoto | ..................... | 292/201 |
| 5,273,324 A * | 12/1993 | Kobayashi | .................... | 292/201 |
| 5,498,040 A * | 3/1996 | Silye | .............................. | 292/201 |
| 5,642,636 A * | 7/1997 | Mitsui | ............................. | 70/237 |
| 5,713,613 A * | 2/1998 | Honma et al. | ................. | 292/201 |
| 5,829,799 A * | 11/1998 | Yamagishi et al. | ........... | 292/201 |
| 6,139,076 A * | 10/2000 | Hara et al. | ................. | 292/336.3 |
| 6,349,983 B1 * | 2/2002 | Dupont et al. | ................ | 292/201 |
| 6,371,537 B1 * | 4/2002 | Vige et al. | ..................... | 292/201 |
| 6,390,517 B1 * | 5/2002 | Ehret | ............................. | 292/201 |
| 6,557,911 B2 * | 5/2003 | Nelsen et al. | ................. | 292/216 |
| 6,733,078 B1 * | 5/2004 | Zelmanov | ................... | 297/378.1 |
| 6,988,749 B2 * | 1/2006 | Hashiba et al. | ............... | 292/201 |
| 7,111,877 B2 * | 9/2006 | Larsen et al. | ................. | 292/216 |

(Continued)

FOREIGN PATENT DOCUMENTS

DE 102006022436 A1 * 11/2007
JP 2010142642 A * 7/2010
WO WO 2010115626 A1 * 10/2010

*Primary Examiner* — Carlos Lugo
*Assistant Examiner* — Alyson M Merlino
(74) *Attorney, Agent, or Firm* — McGlew and Tuttle, P.C.

(57) ABSTRACT

A locking device for a vehicle seat, in particular for a motor vehicle seat, is provided with a locking mechanism for the mechanical locking of a movable catch of the locking mechanism with a counter-element, and with an actuator unit for the actuation of the catch via a drive. A hosing is provided in which the locking mechanism is arranged and mounted, with regard to the required installation space. The locking device provides the possibility of the formation of structurally different variants of the locking device. The actuator unit (4) is arranged in the housing as a shared housing (2) together with the locking mechanism (3).

12 Claims, 3 Drawing Sheets

(56) References Cited

U.S. PATENT DOCUMENTS

| | | | |
|---|---|---|---|
| 7,192,066 B2* | 3/2007 | Ilea et al. | 292/201 |
| 7,243,996 B2* | 7/2007 | Daniels | 297/378.12 |
| 7,325,874 B2* | 2/2008 | Zhang | 297/336 |
| 7,404,605 B2* | 7/2008 | Inoue et al. | 297/378.13 |
| 7,410,217 B2* | 8/2008 | Inoue et al. | 297/378.13 |
| 7,416,254 B2* | 8/2008 | Jennings | 297/378.12 |
| 7,467,815 B2* | 12/2008 | Larsen et al. | 292/201 |
| 7,494,187 B2* | 2/2009 | Inoue et al. | 297/378.13 |
| 7,547,069 B2* | 6/2009 | Diehl et al. | 297/362.11 |
| 2001/0005078 A1* | 6/2001 | Fukushima et al. | 292/201 |
| 2003/0227177 A1* | 12/2003 | Matsuda et al. | 292/216 |
| 2004/0007909 A1* | 1/2004 | Bonk | 297/378.13 |
| 2004/0046434 A1* | 3/2004 | Zelmanov et al. | 297/378.13 |
| 2005/0023877 A1* | 2/2005 | Vermeulen | 297/378.13 |
| 2005/0040656 A1* | 2/2005 | Taga | 292/201 |
| 2011/0006576 A1* | 1/2011 | Muller et al. | 297/378.13 |
| 2011/0006577 A1* | 1/2011 | Muller et al. | 297/378.13 |
| 2011/0012415 A1* | 1/2011 | Muller et al. | 297/378.13 |
| 2011/0204690 A1* | 8/2011 | Torkowski et al. | 297/354.12 |
| 2012/0093580 A1* | 4/2012 | Heeg et al. | 403/376 |

\* cited by examiner

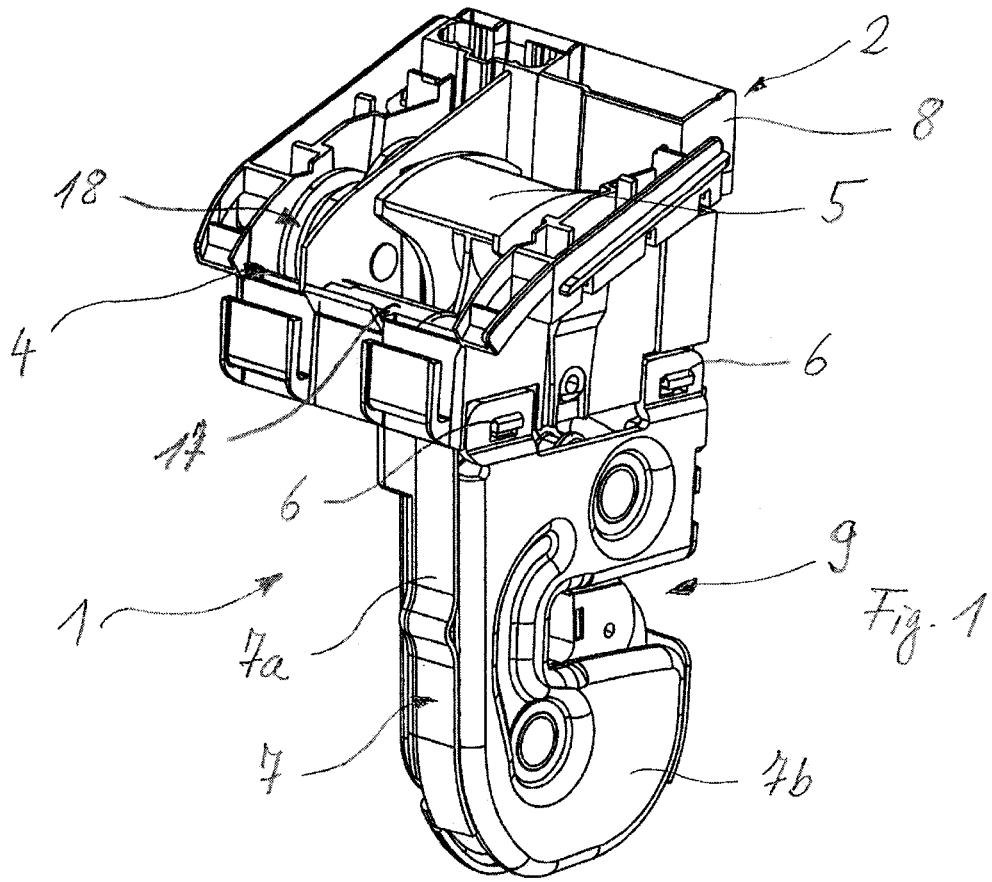
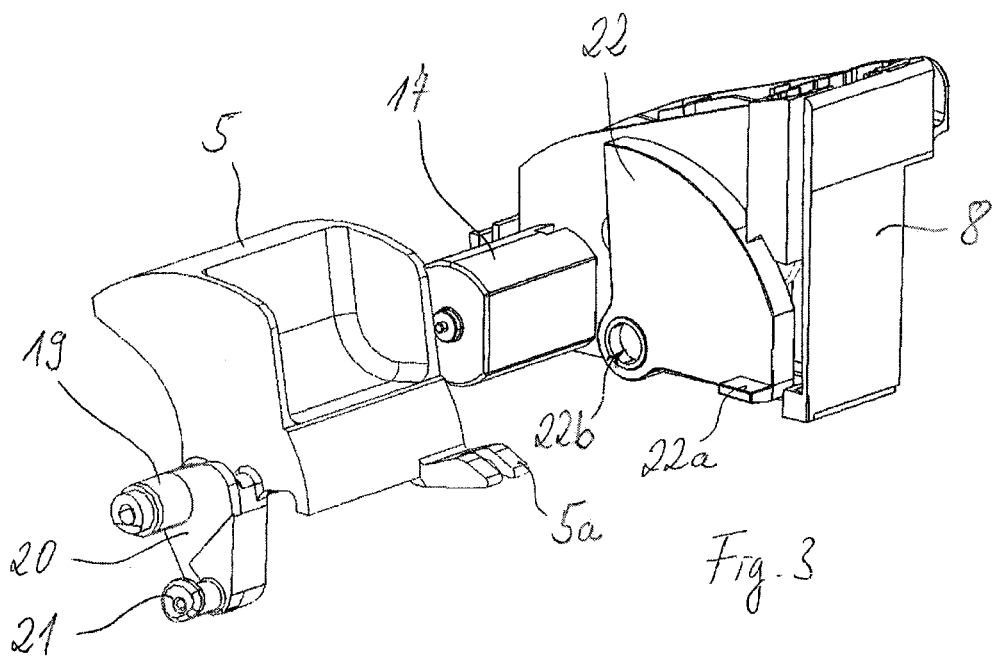

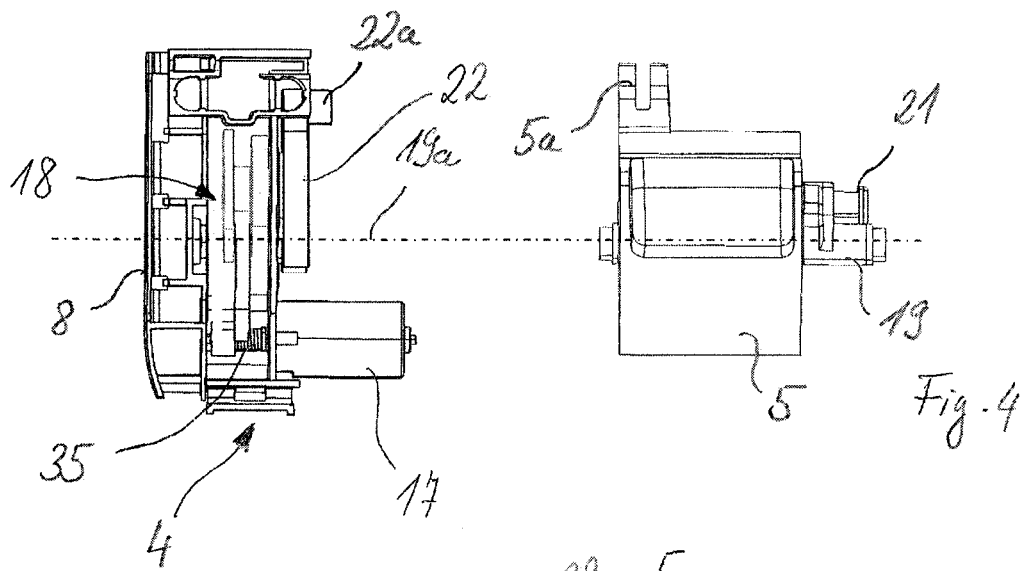
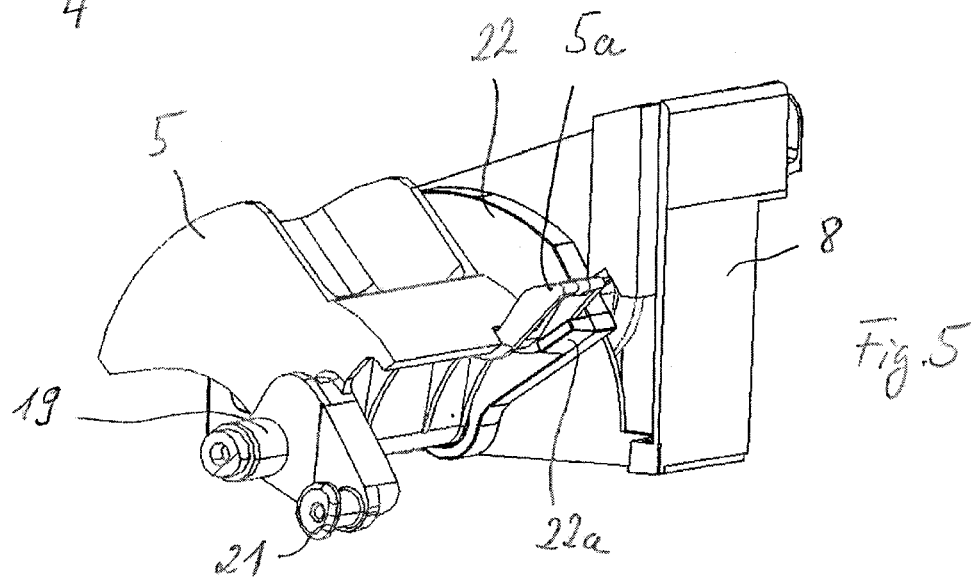
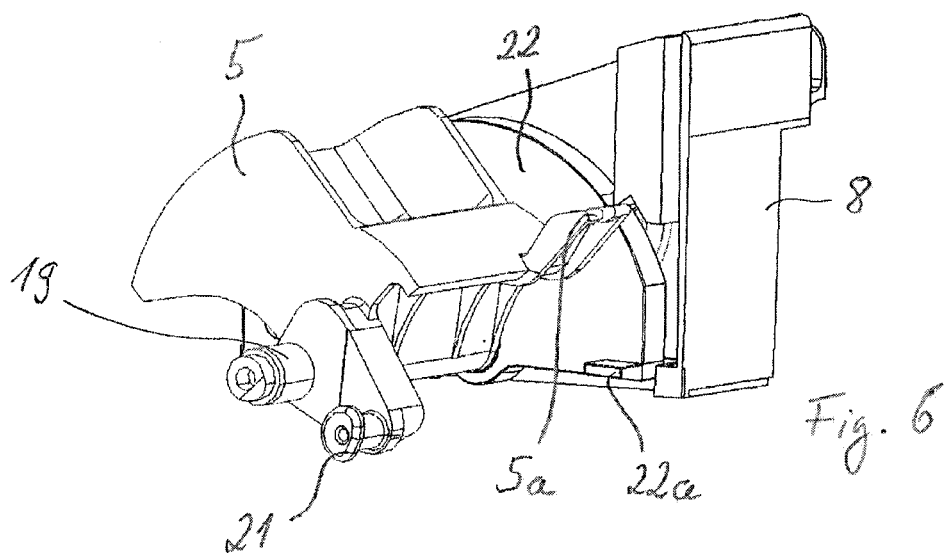
Fig. 4
Fig. 5
Fig. 6

LOCKING DEVICE FOR A VEHICLE SEAT

CROSS REFERENCE TO RELATED APPLICATIONS

This application claims the benefit of priority under 35 U.S.C. §119 of German Patent Application 10 2008 064 458.7 filed Dec. 19, 2008, the entire contents of which are incorporated herein by reference.

FIELD OF THE INVENTION

The invention relates to a locking device for a vehicle seat, in particular for a motor vehicle seat, with a locking mechanism for the mechanical locking and unlocking of a movable catch of the locking mechanism with a counter-element, and with an actuator unit for the actuation of the catch by means of a drive, and with a housing in which the locking mechanism is arranged and mounted.

BACKGROUND OF THE INVENTION

In particular locking and unlocking components for rear seat installations often have a manually actuatable locking and unlocking mechanism, by which a locking of a rear seat backrest of the rear seat installation with a vehicle structure can be produced and released. To increase the comfort, such rear seat installations are being provided increasingly more often with an electrically driven actuator, by which the locking mechanism can also be actuated by motor. Here, generally already existing, purely mechanical locking components are additionally provided with an electric actuation. In previously known solutions an electrically driven actuator is mounted here together with the locking mechanism on an adapter plate. By means of transmission elements, such as angle, lever, linkage and suchlike, which are also fastened on the adapter plate, a coupling takes place between the actuator and the locking mechanism for the transmission of the drive movement of the actuator to the locking mechanism.

With such a solution, it is possible to supplement already existing locking mechanisms with an electric actuation and hereby to construct different variants with the same mechanical locking mechanism with as little technical effort as possible. Solutions which are supplemented in such a way have the disadvantage, however, that they are relatively large and are not infrequently almost twice as large as the actual locking mechanism. The installation space and weight of such locking devices can therefore not be satisfactory. In particular owing to the large installation space, the actually intended simple achievement by this solution of different variants and their integration into different seat installations can therefore scarcely be achieved.

SUMMARY OF THE INVENTION

The invention is therefore based on the problem of improving a generic locking device with a locking mechanism for the mechanical locking of a movable catch of the locking mechanism with a counter-element, and with an actuator unit for the actuation of the locking mechanism by means of a drive, and with a housing in which the locking mechanism is arranged and mounted, with regard to improving the required installation space and the possibility of the construction structurally different variants of the locking device.

This problem is solved according to the invention in a locking device of the type mentioned in the introduction in that the actuator unit together with the locking mechanism is arranged in a shared housing of the locking device. According to the invention, provision is therefore made that the locking mechanism and the actuator unit, provided with a drive, are arranged closer to each other through the arrangement in a shared housing, the locking device therefore takes up a smaller space, has a lower weight and in addition is better protected from damage than previously. In addition, the use of a shared housing makes it possible for both the operating element and also the actuator unit to construct different variants of the locking device with less structural effort than hitherto and to integrate these into seat installations. The solution according to the invention makes it possible, in addition, in the integration of a motor-drivable locking device into a vehicle, to use the same interfaces as were also provided hitherto for locking devices which were to be actuated purely manually. In this context, an interface can be understood to mean for example the fastening points which are already provided on the seat or on a vehicle structure for the fastening of the locking device. Likewise, this can be understood to mean the three-dimensional dimensions of the installation space which is present for the locking device in the vehicle or respectively in the seat installation or required panels or pads. The aspect of the elimination of the requirement for new interfaces has particular importance in automobile construction, because individual components of seat installations often originate from different suppliers. The possibility for the formation of different variants of seat installations without a need for a comprehensive adaptation of the seat installation to the different seat installation variants therefore keeps the logistical and technical effort for different seat installation variants particularly low. Therefore, the invention makes preferred embodiments possible, in which no alterations have to be made to already existing seat installations or respectively vehicles, in order to also make possible an automated unlocking in seats which were hitherto to be unlocked purely manually.

A further preferred advantageous further development of the solution according to the invention can make provision that the actuator unit and the locking mechanism are also arranged together with a manually actuatable operating element in a shared housing. Hereby, also, a particularly compact locking device can be achieved which is able to be integrated simply into existing seat installations. In addition to the advantage of existing interfaces being able to be used, such a solution also makes possible both a manual unlocking and also an automated unlocking.

In addition, particular advantages can be achieved when the locking device has at least one partial housing in which at least one component of the locking device is arranged. The at least one partial housing can be constructed for example as operating housing and can receive the complete actuator unit together with the operating unit. The partial housing, together with other housing parts, produces a total housing of the locking device and can be assembled to this.

In a further preferred embodiment, the locking mechanism can be arranged in its own partial housing. This partial housing can also be supplemented by the addition of at least one further housing part to the total housing of the locking device, in which the latter is arranged and held.

The use of partial housings can bring with it the advantage that the respective functional unit, i.e. in particular the actuator unit together with the manual operating element or the locking mechanism can be subjected to its own functional check before the final mounting of the entire locking device takes place. Thus, faulty functioning of components and functional units can be promptly detected and the final mounting of faulty functional units in locking devices can be prevented.

A final mounting of the locking device in such embodiments according to the invention can expediently only take place after successful functional checking of one or more functional units. In addition, the use of partial housings can also have the advantage that locking devices according to the invention can be formed in a relatively simple manner with different combinations of various functional units, and nevertheless all the different locking devices resulting therefrom, in contrast with the prior art, are substantially arranged entirely in one housing. This advantage can be of particular importance especially when the locking device is to be constructed from functional units which originate from different companies, as is usual in the automobile industry owing to the highly distinct distribution of labour. Thus, for example, the actuator unit can originate from a different company than the locking mechanism. Through the use of partial housings for functional components, interfaces can be defined in a simple manner as standards, to which the functional units are joined together and operatively connected with each other.

The problem is additionally solved by a system of different locking devices in which for each locking device, in relation to other locking devices of the system, both structurally identical and also different components are provided. It is particularly advantageous here if particular components are used in identical form in as many different locking devices as possible, because hereby, despite a large number of variants, the number of different components can be kept as low as possible. Here, in particular, a specific drive such as a direct current motor can be provided as standard drive for several locking devices. An adaptation to different requirements for use can take place by differently configured gears, which reduce or transmit the drive movement and transfer it to the locking mechanism. Likewise, for several locking devices which are structurally different from each other, respectively the same or at least a substantially identical housings can be provided. This also makes possible a rapid and favourably priced adaptation of locking devices to different requirements and the integration of locking devices in seat installations.

The problem is solved in addition by a method for the production of a locking device for a vehicle seat. The method comprises the steps of providing a locking mechanism and an actuator unit to drive the locking mechanism, bringing the locking mechanism and the actuator unit into operative connection with each other and arranging both a manually operable operating element and also the actuator unit in a shared housing.

Further preferred developments of the invention will be seen from the claims, the description and the drawings. The invention is explained in further detail with the aid of example embodiments illustrated purely diagrammatically in the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a perspective illustration showing a locking device according to the invention;

FIG. 3 is an exploded illustration showing part of the operating housing of the locking device with an actuator unit and an operating handle of FIG. 1;

FIG. 4 is a top view showing the elements of FIG. 3;

FIG. 5 is a perspective illustration showing the operating handle and a driven gear of FIG. 3 after a motor-driven unlocking;

FIG. 6 is a perspective illustration showing the operating handle and a driven gear of FIG. 3 after a resetting of the driven gear, which has taken place automatically.

DESCRIPTION OF THE PREFERRED EMBODIMENTS

Figure 2:
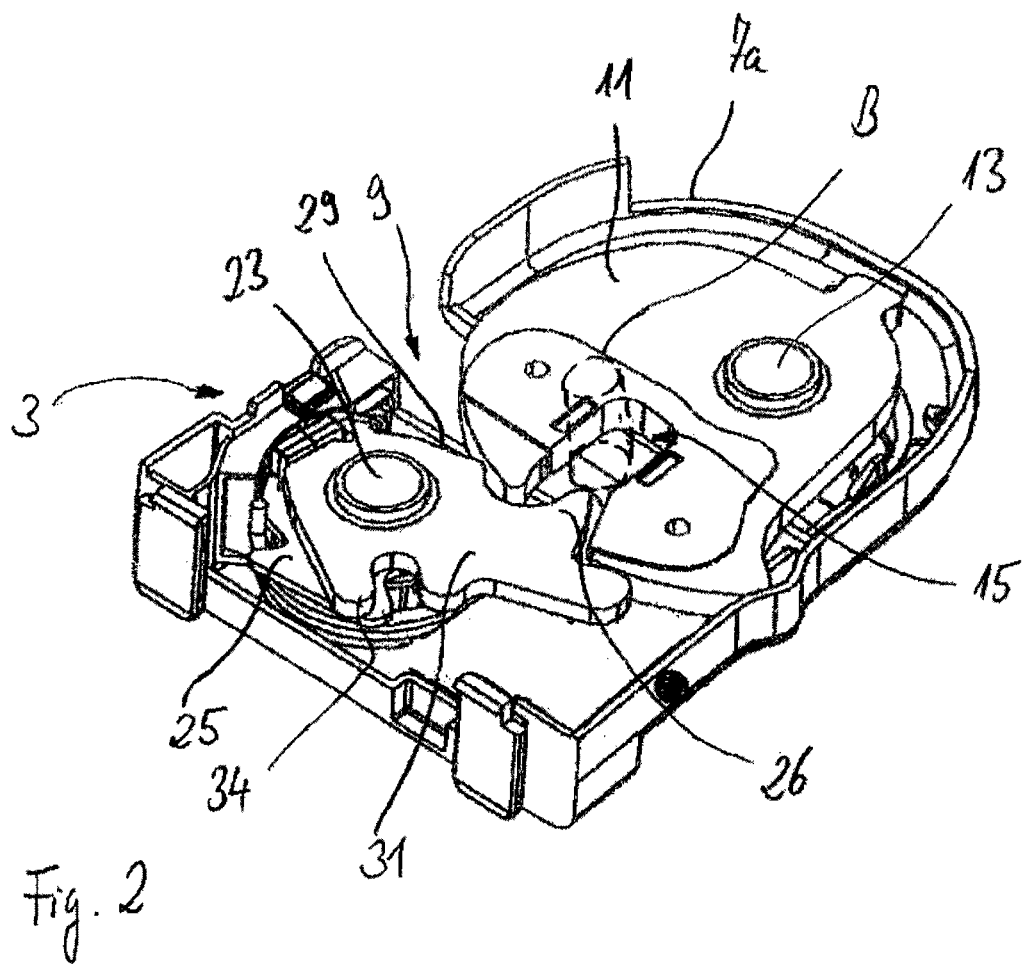
FIG. 2 is a perspective partial illustration showing a locking mechanism of the locking device of FIG. 1.

Referring to the drawings in particular, in FIGS. 1 and 2, an example embodiment is shown for a locking device 1 according to the invention, as can be integrated for example in a swivellably articulated backrest for a rear seat installation. With such a locking device, an upright position of the backrest can be arrested or respectively secured by cooperation of the locking device with a counter-element B. By means of an actuation of the locking device 1, this arresting is to be releasable, for example in order to fold down the rear seat backrest in the direction of a seating surface of the rear seat installation. The locking device 1 can be integrated here into the rear seat backrest, and the counter-element B (FIG. 2), for example a bolt, can be arranged so as to be fixed to the vehicle or respectively fixedly on the vehicle structure. Basically, however, it is also possible to provide the counter-element on the rear seat backrest and to provide the locking device on the vehicle structure.

The locking device 1 is provided with a multiple-part housing 2. In the latter, a locking mechanism 3 (cf. FIG. 2) known per se is arranged, and an actuator unit 4 (FIG. 1) for an electrically produced drive movement of the locking mechanism for its unlocking, and mounted on the housing 2. In addition to the automated drive movement, the locking mechanism 3 can also be actuated manually with the aid of a swivellably articulated operating handle 5, in order to thereby cancel an arresting between the locking mechanism 3 and the counter-element B. Embodiments are also possible, in which no operating handle is provided and the unlocking always take place with the actuator unit 4.

The housing can be composed of several partial housings 7, 8, wherein preferably each partial housing 7, 8 receives a functional unit. The partial housings 7, 8 can be connected with each other, for example by clip connections, screw connection or other fastening means 6. In the example embodiment, the locking mechanism 3 is arranged in a first partial housing 7, between its two housing shells 7a, 7b. On the housing shells 7a, 7b a mounting 9 is formed, which serves to receive the counter-element B. The locking mechanism can be constructed in a manner known per se with regard to its mechanical components, their articulation and interactions with each other. Principles of such locking mechanisms are disclosed for example in DE 10 2004 056 086 B3, DE 103 04 574 B4 (corresponding to U.S. Pat. No. 7,044,552) and DE 103 05 177 A1 (corresponding to U.S. Pat. No. 7,188,906), the respective disclosure content of which is incorporated herein by reference. Therefore, structure of the locking mechanism is only described in detail in a rudimentary manner below.

As illustrated in FIG. 2, a catch 11 of the locking mechanism is swivellably mounted on a first bearing pin 13, which in turn is securely mounted on and between the two housing shells 7a, 7b and hence on the housing 2. The catch 11 could, however, also be movably mounted in a different manner. For cooperation with the counter-element B, the catch 11 has a groove-shaped hook jaw 15, which in a locked state of the locking device 1 crosses the mounting 9 at least approximately perpendicularly and surrounds the counter-element B from three sides, whilst in an open state it opens obliquely towards the mounting 9. A second bearing pin 23 is arranged parallel to the first bearing pin 13 and is mounted in the same manner on the housing 2. On the second bearing pin 23, a tensioning eccentric 25 is swivellably mounted as securing element, which is pre-stressed towards the catch 11 by a spring acting between housing 2 and tensioning eccentric 25, which is not illustrated in further detail. In the locked state, the tensioning eccentric 25 as a first securing element exerts a closing moment on the catch 11 by means of a tensioning surface 29 which is curved eccentrically to the second bearing pin 23.

A catch piece 31 is mounted as a second securing element alongside the tensioning eccentric 25 and likewise swivellably on the second bearing pin 23. The catch piece 31 has a catch surface, which is situated in the vicinity of the tensioning surface 29, but in the locked state is spaced apart from the catch. In the case of a crash, when the catch 11 possibly undergoes an opening moment and presses the tensioning eccentric 25 away, the catch surface arrives in abutment against the catch 11, without the catch 11 being able to exert a moment onto the catch piece 31. The catch piece 31 therefore serves to support the catch 11 and to prevent the opening thereof. In addition, the catch piece 31 in this position closes the hook jaw 15, which is open on one side, with a closure extension 26. Both securing elements therefore secure the locked state.

An unlocking lever 34 for unlocking the locking device 1 projects from the catch piece 31 as a formed-on arm. By moving this unlocking lever 34, for example by means of a Bowden cable, from the locked state downwards, the catch piece 31 and hence the catch surface swivels away from the catch 21. By means of a carrier, the catch piece 31, if applicable after a short idle stroke, entrains the tensioning eccentric 25 and mounts the catch 11 by means of a tension spring which is not illustrated, so that the catch releases the counter-element B. By suitable geometric conditions, the catch piece 31 and/or the tensioning eccentric 25 in the positions which they have assumed after the movements relative to the catch 11, exert an opening moment on the catch 11 or hold the latter open otherwise. In this position, through a swivelling movement of the rear seat backrest, the counter-element B can now be guided out from the hook jaw 15 by the relative movement of the locking device 1 in relation to the counter element B, and hence the locking can be completely cancelled.

A renewed locking of the locking device 1 can take place by the dropping in of the counter-element B, which swivels the catch 11 back. The tensioning eccentric 25 and the catch piece 31 assume their previously described initial positions of the locked state. The spring, previously acting on the catch piece, loses its contact to the catch piece 31.

In the second partial housing 8, as can be seen in FIG. 1 and in parts in FIGS. 3-6, the actuator unit 4 is arranged. The latter has an electric direct current motor 17, the drive movement of which is transmitted to a gear 18. The motor 17 can be actuated by an actuating element which is not illustrated in further detail, for example a push-button, switch or a knob in the region of a driver's seat. The actuation element can also be housed as a push-button inside the vehicle (instrument panel, boot or respectively in the immediate vicinity of the locking device). It can also be situated directly beneath the components or respectively can be actuated via the operating handle 5. In the latter case, a direct coupling between the operating handle 5 and the locking mechanism 3 does not have to compulsorily exist.

The motor drive movement, reduced owing to the multi-stage spur gear 18, is then transmitted, in the manner described in further detail below, likewise to a rotary shaft 19 (FIG. 1), like the manual actuation movement via the operating handle 5 in an unlocking of the locking device 1 in relation to the counter element B which is carried out manually. With a lever 20 arranged on the rotary shaft and with a transmission element 21 situated thereon at a distance from the rotation axis 19a of the rotary shaft 19, said transmission element 21 also being articulated on the unlocking lever 34 (FIG. 2), the movement of the rotary shaft 19 can then be transferred to the unlocking lever 34.

As can be seen in FIGS. 3-6, the operating handle 5 is mounted on one of its sides in a bearing site 22b of a driven gear 22 and is freely rotatable with respect to the latter. The operating handle 5 is mounted on its other side on the housing in the region of the lever 20 in a manner not illustrated in further detail. A rotation axis 19a of the operating handle 5 runs here coaxially to a rotation axis of the driven gear 22. In the region of its side pointing towards the gear 18, the operating handle has a carrier 5a, which cooperates with the driven gear 22 arranged coaxially to the rotation shaft 19. The driven gear 22 is driven by the motor and the gear 18. A stop 22a is formed on the driven gear 22, which cooperates with the carrier 5a such that with a motor-driven rotary movement of the driven gear 22, the operating handle is entrained on this rotary movement by abutment of the stop 22a against the carrier 5a. With a motor-driven opening movement of the locking mechanism, the operating handle 5 is therefore passively entrained. The rotary drive movement, which is passed on from the electric motor 17 via the gear 18 to the drive shaft 19, is therefore passed on with inclusion of the operating handle 5 to the transmission element 21, which hereby carries out a rotary movement about the rotation axis 19a.

A manually actuated unlocking takes place by a manual actuation of the operating handle 5. Hereby, also, the rotation shaft 19 is set in rotation and the locking mechanism is opened. In contrast to the motor activation, however, the driven gear 22 and the gear 18 and the motor shaft do not also rotate here. The operating handle 5 and the actuator unit 4 therefore act on the same output for unlocking the locking mechanism, in which the catch piece 31 is set in rotation, whereby it frees the catch 11 and hereby releases the locking.

With a motor-driven unlocking, the driven gear 22 is situated, after the unlocking, in the swivelled position shown in FIG. 5, in which the driven gear 22 has entrained the operating handle 5 into its unlocking position. As can be seen in FIG. 4, a helical spring 35 is arranged as a resetting element on the motor shaft, projecting from the motor, which is tensioned on the drive movement of the motor for unlocking. Instead of a helical spring 35, other spring-elastic elements could also be provided. Likewise, the resetting element could be arranged at a different site between the motor 17 and the driven gear 22. As soon as the motor 17 is stopped after the unlocking, the spring 35 overrides the motor holding torque and thereby now turns the motor shaft back in the reverse direction in relation to the direction of rotation of the unlocking movement. Here also, the gear 18 or respectively is gear wheels is turned back in the respectively reverse direction. Hereby, the driven gear 22 is now also turned back into its original position. Its final position is pre-defined by a stop on the housing side. This situation is illustrated in FIG. 6. In the following locking of the locking mechanism 3, the operating handle 5 is turned back into its initial position by a reaction of the locking mechanism 3 onto the operating handle and contrary to its direction of rotation in the unlocking movement.

In connection with the actuator unit, different types of gears 18 can be provided. In the illustrated example embodiment, this is a five-stage spur gear, which acts on the driven gear 22. In addition, for example, a combination of planetary, spur and spindle gears or a combination of planetary and spur gears or else a pure spur gear can be provided. Basically, further types of gear are also possible for the motor/gear unit of the actuator unit 4, which is preferably integrated without a separate housing into the partial housing 8 which is constructed as operating housing.

On mounting of the locking device, the two functional units of locking mechanism 3 and actuator unit 4 can be initially mounted entirely independently of each other into their respective partial housings 7, 8. Subsequently, a function test can be carried out at least for one functional unit. In so far as this runs positively, the final mounting of the locking device can take place, in which the two partial housings are connected with each other at their mounting interfaces, and the functional units are operatively connected with each other. For this, the partial housings 7, 8 can be screwed, welded or connected with each other rigidly by another suitable joining technique.

While specific embodiments of the invention have been described in detail to illustrate the application of the principles of the invention, it will be understood that the invention may be embodied otherwise without departing from such principles.

What is claimed is:

1. A locking device for a vehicle seat, the locking device comprising:
   a vehicle seat locking mechanism for mechanical locking of a movable catch of the vehicle seat locking mechanism with a counter-element;
   an actuator unit for the actuation of the vehicle seat locking mechanism by means of a drive, said actuator unit comprising a motor shaft and a gear;
   an operating element for manual actuation of said vehicle seat locking mechanism, wherein said gear and said motor shaft do not rotate when said operating element is actuated;
   a housing in which the vehicle seat locking mechanism is arranged and mounted, the actuator unit being arranged together with the vehicle seat locking mechanism in the housing, said housing comprising a vehicle seat locking mechanism partial housing and an actuator unit partial housing, said vehicle seat locking mechanism being arranged in said vehicle seat locking mechanism partial housing, said actuator unit being arranged in said actuator unit partial housing, wherein a motor drive movement of the actuator unit is only provided for the unlocking of the moveable catch with said counter element, said actuator unit comprising a rotary shaft, said motor drive movement being transmitted to said rotary shaft upon actuation of said motor, said operating element being connected to said rotary shaft such that said rotary shaft is rotated upon actuation of said operating element, wherein said vehicle seat locking mechanism is opened via rotation of said rotary shaft upon actuation of at least one of said motor and said operating element, said rotary shaft and said operating element being arranged in said actuator unit partial housing.

2. The locking device according to claim 1, wherein the actuator unit is arranged together with the operating element for the manual actuation of the vehicle seat locking mechanism in the housing, said vehicle seat locking mechanism comprising a catch piece, said catch piece and said movable catch being arranged in said vehicle seat locking mechanism partial housing, said catch piece being mounted for movement such that said catch piece is movable between a locked state and an unlocked state, said operating element being mounted for movement such that said operating element moves from an operating element locked position to an operating element unlocked position, wherein said catch piece moves from said locked state to said unlocked state when said operating element moves from said operating element locked position to said operating element unlocked position.

3. The locking device according to claim 2, wherein the actuator unit for a motor-driven unlocking of the vehicle seat locking mechanism acts on the operating element and moves the operating element.

4. The locking device according to claim 1, wherein the vehicle seat locking mechanism comprises a securing element to secure the mechanical locking of the moveable catch with the counter-element, wherein the securing element is movable relative to the moveable catch for unlocking the moveable catch with the counter-element.

5. The locking device according to claim 1, wherein the operating element is entirely mounted in said actuator unit partial housing.

6. The locking device according to claim 1, further comprising a connection between the vehicle seating locking mechanism partial housing and the actuator unit partial housing.

7. The locking device according to claim 1, wherein the drive of the actuator unit comprises a direct current motor, the direct current motor being arranged in the housing.

8. The locking device according to claim 1, further comprising:
   a driven gear operatively connected with the drive of the actuator unit arranged in the housing, an output movement of the driven gear being transferred to the vehicle seat locking mechanism, said actuator unit comprising a rotary shaft, said vehicle seat locking mechanism comprising a securing element, said securing element being connected to said rotary shaft, said securing element being mounted for movement such that said securing element is movable between a locked state and an unlocked state via at least said rotary shaft.

9. The locking device according to claim 1, wherein the actuator unit and the operating element act on a same output for the actuation of the vehicle seat locking mechanism.

10. The locking device according to claim 1, further comprising:
    a resetting element, by means of which, independently of a motor drive movement, at least said gear is reset into an initial position after a motor-driven unlocking.

11. The locking device according to claim 10, wherein a gear member which acts on the operating element in the motor-driven unlocking process is able to be reset with the resetting element.

12. A locking device system comprising: a locking device, the locking device comprising:
    a vehicle seat locking mechanism with a moveable catch for the mechanical locking of a movable catch of the vehicle seat locking mechanism with a counter-element;
    an actuator unit for the actuation of the vehicle seat locking mechanism by means of a drive, said actuator unit comprising a motor shaft and a gear;
    an operating element for manually actuating said vehicle seat locking mechanism, said operating element being uncoupled from said motor shaft and said gear, wherein said motor shaft and said gear remain in a fixed position when said operating element is manually actuated; and a housing in which the vehicle seat locking mechanism is arranged and mounted, the actuator unit being arranged together with the vehicle seat locking mechanism in said housing, said housing comprising a first partial housing and a second partial housing, said actuator unit being arranged in said first partial housing, said vehicle seat locking mechanism being arranged in said second partial housing, wherein an output movement of a driven gear connected with the drive of the actuator unit is transferred to the vehicle seat locking mechanism, said actuator unit comprising a rotary shaft, said rotary shaft being rotated via movement of said operating element when said operating element is actuated, said rotary shaft being rotated via said motor when said motor is actuated, said rotary shaft and said operating element being arranged in said first partial housing.

* * * * *